March 19, 1940.  D. W. McILHINEY  2,194,184

AUTOMATIC CONTROL APPARATUS

Filed June 10, 1936  2 Sheets-Sheet 1

INVENTOR.
Donald W. McIlhiney
BY
Kenyon & Kenyon
ATTORNEYS.

Patented Mar. 19, 1940

2,194,184

UNITED STATES PATENT OFFICE 2,194,184

AUTOMATIC CONTROL APPARATUS

Donald W. McIlhiney, Great Neck, N. Y.

Application June 10, 1936, Serial No. 84,590

1 Claim. (Cl. 236—44)

My invention relates to automatic controls and has for its object a control apparatus having the power to anticipate the effect of changes in a condition which is to be maintained at a certain value and to reduce, by this means, the variations in that value caused by a discontinuous source or by changes in the external environment.

Figure 1:
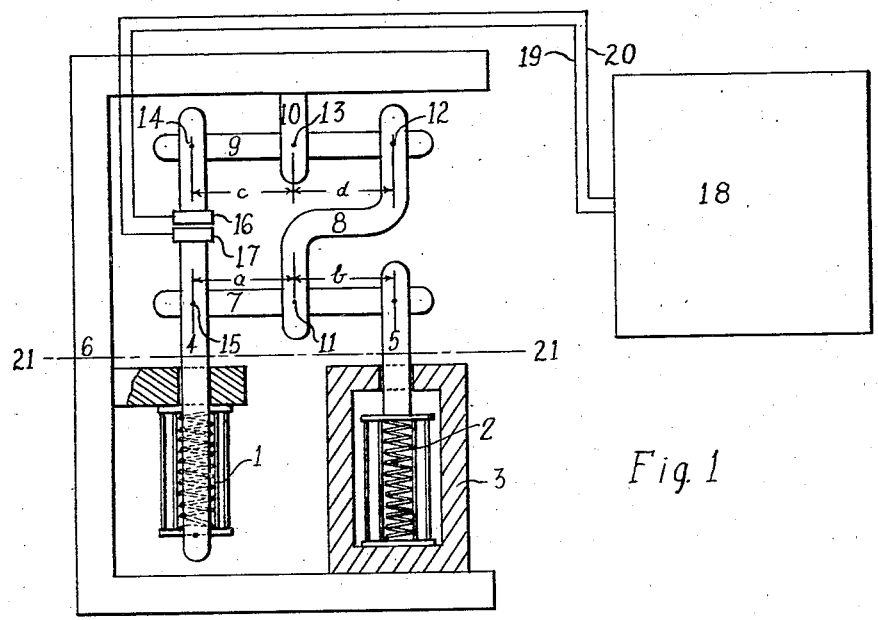
Figure 2:
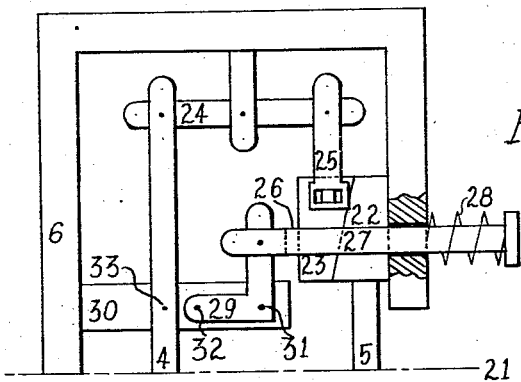
Figure 3:
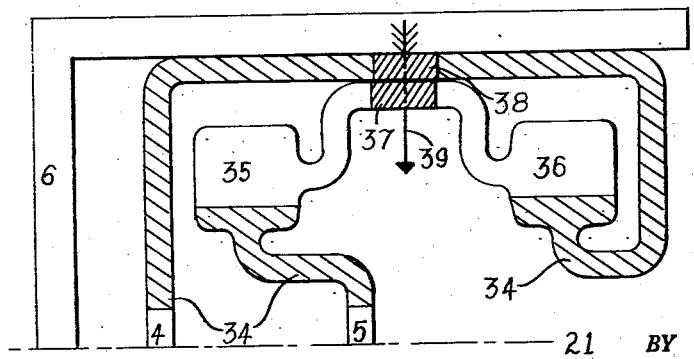
Figure 4:
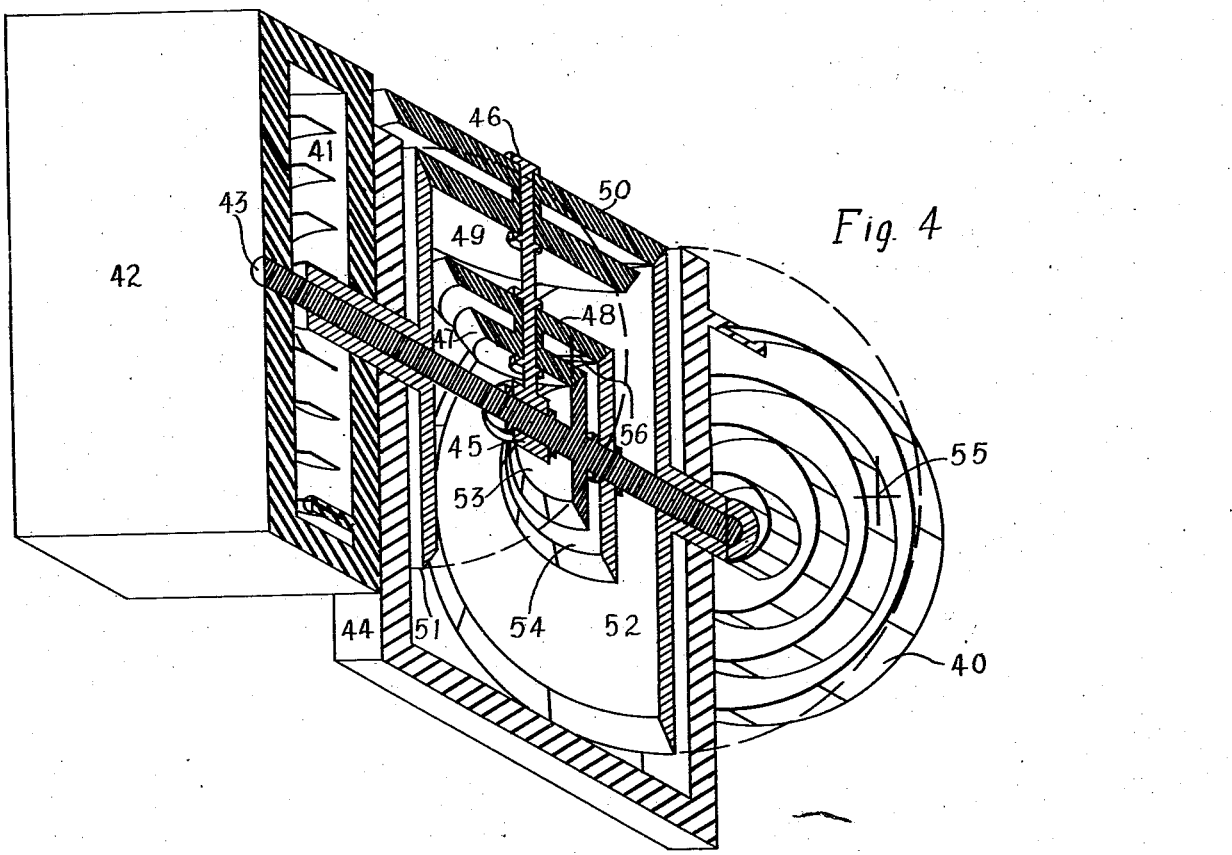

I attain this object by mechanisms and combinations of mechanisms illustrated in the accompanying figures. Figure 1 shows a control employing levers. Figure 2 shows a control employing cams or inclined planes. Figure 3 shows a control employing compressed gases. Figure 4 is a cavalier projection of a control employing gears.

The term instrument in this specification is intended to describe an apparatus having a usable output force which is proportional to some external condition or quality. For example: The common bimetallic arm or coil used in thermostats would be considered as an instrument as it responds with a physical movement to a change in temperature and its position is a measure of the temperature; a thermocouple is also an instrument according to this definition, the output force in this instance being in the form of an electric voltage. This term is also intended to include mechanisms which include means for converting the output forces from one form to another. An example of this would be a bimetallic coil sensitive to temperature, which was associated with a rheostat and a battery so as to convert the physical movement proportional to temperature into an electrical variation proportional to temperature. The use of amplification to increase the sensitivity of a simple apparatus is contemplated in the definition and the simple apparatus plus the amplifier will be considered as the instrument.

It is assumed in this specification that ideal parts are employed or in other words, secondary effects are ignored. An inductance, for example, is considered as having neither resistance nor capacitance. Solid parts are considered as perfectly rigid, unless otherwise stated. The instruments are assumed to respond instantaneously and exactly to any change in their environment. This assumption is in accord with usual engineering practice.

The mechanisms covered by this specification cause a relative movement of two parts as a result of a change in value in the condition or quality to which the instruments involved are sensitive. This relative movement is used to control the source of the quality or condition it is desired to maintain at a certain value. In the case of a domestic oil burner, for example, which is capable of being turned "on" or "off" only and which is normally controlled by electrical means, each of the two parts whose relative motion is the result of my mechanisms, would be equipped with a contact and their relative motions would either open or close the control circuit. It is not intended that this specification and figures or any claim based on them shall be limited as to the means employed to effect the desired control of the source.

The automatic controls covered by this specification have three main parts or elements. First a delay device which functions to cause an instrument to respond to a change in the condition or quality to which it is sensitive with a delay with respect to time. The delay device will be referred to as "partially controlling" the instrument. Second: An instrument freely exposed to the condition to which it is sensitive. Third: The output forces of these two instruments are combined by a linkage which operates according to the following relation, $Y=M(NX_1+X_2)$, in which Y represents the movement of a secondary part of the linkage, M and N are constants, fixed by the proportions of the linkage, determining the relative efficacy of the two instruments in producing Y, and $X_1$ and $X_2$ represent the primary effects due to the two instruments. The factors Y, M, and N will be readily recognized in the equations given in the descriptions of the various figures; these equations give the design basis for achieving desired values of M and N. The relative movements of the secondary part of the linkage (Y) and the freely exposed instrument are used to control the source of the condition or quality to which the two instruments are sensitive.

The result of this novel combination of elements is to produce a control mechanism which is affected by the derivative with respect to time of the value of the condition to be controlled as well as by the absolute value. In this way it is able to act more promptly than would a simpler control which depends on the absolute value alone. The result of a using the interaction of two moving parts instead of a fixed and a movable part (under the control of a freely exposed instrument) as controls, may be expressed as automatically adjusting the "zero" or mean setting to suit varying conditions, i. e., a rising or a falling value of the condition or quality to be controlled.

The delay device referred to consists of a resistance to the flow of and a storage capacity for, the energy producing a condition or the condition itself, so as to cause an instrument sensitive to the condition to have a response to a change in the said condition delayed with respect to time when so placed in relation to the delay device as to be partially controlled by it. The various devices described in this specification and accompanying figures illustrate the precise meanings of the terms resistance and storage capacity as used here.

The manner in which such a delay device operates may be illustrated by the following example. If the delay device 42 in Figure 4 be considered as composed of two layers of material, the outer of high thermal resistance but of negligible thermal capacity, and the inner of high thermal capacity but of negligible thermal resistance, its action in partially controlling the instrument 41 enclosed in it may be analyzed as follows. The temperature surrounding the delay device 42 may be represented by the following equation:

$$E = E_0 + E_1 \sin \omega t \quad (1)$$

in which E represents the instantaneous value of the temperature, $E_0$ the value which it is desired to maintain, $E_1$ the amplitude of the "hunting" caused by the operation of the controls, and $\omega$ equals $2\pi$ times the frequency of the "hunting." This is an approximation to an actual case in that the "hunting" will be only a very close approximation to a pure sine wave, but the extension of the argument to include a more complex expression for the "hunting" is obvious. The temperature inside 42, designated by $e$, will be given by the following equation:

$$e = E_0 + \frac{E_1}{\sqrt{1+\omega^2 R^2 C^2}} \sin(\omega t + \tan^{-1} - \omega RC) \quad (2)$$

in which R represents the thermal resistance and C the thermal capacity of the delay device 42. If $\omega RC \gg 1$ $$e \doteq E_0 + \frac{E_1}{\omega RC} \sin(\omega t - \pi/2) \doteq E_0 - \frac{E_1}{\omega RC} \cos \omega t \doteq E_0 - \frac{1}{RC} \times \frac{d}{dt} E_1 \sin \omega t \quad (3)$$

As the effect of the improved controls covered by this invention is to greatly increase $\omega$, this further approximation gives a simple guide in designing a delay device for a specific type of installation. The factor N in the equation covering the linkage may be employed to counteract the factor $1/RC$ in Equation 3. $e$ is the temperature indicated by instrument 41 when partially controlled by delay device 42.

In Figure 1, 1 and 2 represent instruments whose output forces result in linear motions along their main axes. Instrument 2 is inclosed in delay device 3 (shown in section). The output forces of the two instruments are transmitted by the rigid bars or rods 4 and 5. The instruments 1 and 2 are supported by the frame 6 in such a way that a change in the condition to which they are sensitive will cause bars 4 and 5 to move in opposite directions. Bars 4 and 5 are flexibly attached to primary lever 7. One end of link 8 is attached to point 11 on lever 7 and the other end to point 12 on secondary lever 9. Lever 9 is supported at point 13 by arm 10 which is rigidly attached to base 6. If it be assumed that the condition to which instruments 1 and 2 are sensitive has been constant long enough for both instruments to indicate the same value (interior and exterior of delay device 3 in equilibrium) and that then the condition changes, instrument 1 will respond and cause a movement of bar 4, instrument 2 will respond slowly and cause a correspondingly slow movement of bar 5. This will, in general, cause a movement of point 11, link 8, and point 12. The movement of lever 9 will produce a movement of point 14. $a$, $b$, $c$, and $d$ in the figure represent lengths. The movement of bar 4 is directly proportional to the condition to which the instruments are sensitive. The movement of point 14 is related to the movements of the bars 4 and 5 in the following way. If $W_n$ represents a movement of the $n$th part, then $$-W_{14} = \frac{c/d}{1+a/b}\left(\frac{a}{b}W_5 + W_4\right) \quad (4)$$

If points 12 and 13 are interchanged, the general action of the mechanism will be unaltered and the movement of point 14 will be given by the following $$W_{14} = \frac{1+c/d}{1+a/b}\left(\frac{a}{b}W_5 + W_4\right) \quad (5)$$

If points 11 and 15 be interchanged but lever 9 remain connected as in the figure, then the following relation will hold $$-W_{14} = \frac{b}{a} \times \frac{c}{d}([1+a/b]W_5 + W_4) \quad (6)$$

If both the above changes be made, the following relation will hold $$W_{14} = \frac{b}{a}(1+c/d)([1+a/b]W_5 + W_4) \quad (7)$$

16 represents an electrical contact which is mechanically connected to point 14 and shares its motion. 17 represents a second contact mounted on bar 4. One or both of these contacts may be so mounted as to be capable of giving way under mechanical pressures and so avoiding the setting up of strains in the mechanisms when the circuit is completed. 18 represents the source of the condition to which instruments 1 and 2 are sensitive. Source 18 is connected to the contacts 16 and 17 by the wires 19 and 20. Source 18 is of such nature as to be controlled by the circuit composed of contacts 16 and 17 and wires 19 and 20.

As a specific example of the types of apparatus represented by Figure 1, assume that instruments 1 and 2 are sensitive to humidity. Then delay device 3 would be a box of material, similar in many of its characteristics to blotting paper, which would resist the flow of water vapor between interior and exterior and the material of the walls and the air in the interior would constitute a storage capacity for the water vapor. If the value of the humidity should increase, instrument 1 would lengthen in accord with the rise but instrument 2 would be delayed in its action due to the necessity for the water vapor to diffuse through the walls of delay device 3 and to increase the dampness of the walls and the air inside. When equilibrium is again established between the exterior and interior of 3, instruments 1 and 2 again will indicate the same.

If delay device 3 be removed and length $a$ be made equal to length $b$, both instruments would move the same amount in opposite directions with the result that points 11, 12, and 14 would not move at all. In this event the action of the mechanism would be the same as if contact 16 were attached to base 6 and instrument 1 were acting alone. With the complete mechanism as shown in the figure, a rise in the condition to which the instruments are sensitive would cause bar 4 to move down while bar 5 would take some time to respond. This would result in points 11 and 12 moving down and point 14 moving up, the effect being to separate contact 16 and contact 17 more rapidly than in the simpler case. As such a rise would normally occur when the value of the condition is below the normal or zero value, the result of the action of the mechanism is to open the contacts before the zero is reached from below (in the case of simple "on" and "off" contacts. The action is similar in the case of more complex control systems.).

Figure 2 shows a modification of the upper part of Figure 1. If the part of Figure 1 above the line 21 be removed and the apparatus shown in Figure 2 substituted, an equivalent motion will result. 22 and 23 represent cams or inclined planes and constitute the primary parts. Cam 22 slides on frame 6 and is moved by bar 5. Cam 23 is moved by bar 4 through lever 24 and link 25 and slides on cam 22; this arrangement is due to the manner of mounting instrument 1 in Figure 1, if instrument 1 were mounted similarly to instrument 2 so that both moved in the same direction under the same stimulus, lever 24 would be unnecessary. Follower 26, constituting the secondary part, rides on one face of cam 23 and is rigidly attached to bar 27 and is held against the face of cam 23 by spring 28. The motion of bar 27 is turned through a right angle by lever 29 which is hinged on arm 30 of frame 6 at point 31. Lever 29 is so proportioned that the movement of point 32 equals that of follower 26. In this figure, point 32 corresponds to point 14. If $U_n$ represents a movement of the $n$th part and $Q_n$ represent the slope of the $n$th inclined plane or cam, then the following relation will hold, $$U_{32} = Q_{23}\left(\frac{Q_{22}}{Q_{23}}U_{22} + U_{23}\right) \quad (8)$$

Figure 3, shown entirely in section except for frame 6, shows a second modification of the upper part of Figure 1. 34 represents an incompressible fluid whose sole function is to transmit motion from one point to another. 35 and 36 represent chambers filled with a compressible gas or fluid and constitute the primary parts. 37 and 38 represent solid plugs which are free to move within their tubes. Plugs 37 and 38 have slots cut into them so that they constitute a light valve for a ray of light represented schematically by 39. Plug 37 constitutes the secondary part. If plugs 37 and 38 be arranged to bridge a gap in the tube guiding them, their sides would be accessible and could be provided with contacts or other control devices. Plug 37 being free to move takes a position so that it has equal pressures on its two ends. If $F_n$ represent a motion of the $n$th part and $K_n$ represent the product of pressure and volume in the $n$th chamber, then the following relation will hold, $$F_{37} = \frac{K_{35}}{K_{35}+K_{36}}\left(\frac{K_{36}}{K_{35}}F_5 + F_4\right) \quad (9)$$

Figure 4 shows a further modification of the invention employing rotations and gears instead of linear motions and levers. It is shown entirely as a section on the centerline with the exception of instrument 40. It is intended that this figure, the following description, and claim based on it will include conventional gear trains as well as the friction wheels (gears with an infinite number of teeth) which are shown in the figure for the sake of simplicity. 41 represents an instrument similar to 40 but so mounted as to rotate in the opposite direction under the same stimulus. 42 represents a delay device partially controlling instrument 41. The shaft 43 is held immovable by 42 which in turn is rigidly attached to base 44. The block 45 is free to turn on the shaft 43 but is not free to move along it. The supplementary shaft 46 is held firmly at one end in the block 45 and shares its motion. The gears 47 and 48 are fastened rigidly together and are free to revolve around supplementary shaft 46 but are constrained from sliding along it. Gears 49 and 50 similarly mounted on shaft 46. Gear 51 rotates on shaft 43 and is driven by instrument 41. Gear 52 is driven by instrument 40. Gear 53 is rigidly attached to shaft 43 while gear 54 is free to rotate on it but not free to move axially. Gear 53 meshes with gear 47 only. Gear 54 meshes with gear 48 only. Gear 51 meshes with gear 49 only. Gear 52 meshes with gear 50 only. Gears 51 and 52 are the primary parts and gear 54 the secondary. If instrument 40 and/or instrument 41 causes rotations of gears 51 and 52, supplementary shaft 46 will, in general, rotate around shaft 43 similarly to a spoke in a wheel. This motion will cause a rotation of gears 47 and 48 due to the interaction between the immovable gear 53 and gear 47. The resulting rotation of gear 48 will in turn cause a rotation of gear 54. The relative rotations of gears 52 and 54 are used to control the source of the condition to which 40 and 41 are sensitive. If $S_n$ represent a rotation of the $n$th gear and $D_n$ represent the diameter of the $n$th gear, then the rotation of gear 54 will be given by the following relation $$S_{54} = \frac{D_{48}}{D_{47}} \times \frac{D_{53}}{D_{54}} \times \frac{D_{49}}{D_{49}+D_{50}}\left(\frac{D_{50}}{D_{49}}S_{51} + S_{52}\right) \quad (10)$$

Should the diameters of the various gears be such as to necessitate a different order of assembly on their shafts, due to certain values of M and N, the operation of the mechanism will be unaltered provided Equation 10 is adhered to. Similarly if gears 49 and 50 should be of the same diameter they would be combined into a single gear.

As a specific example of the operation of Figure 4, assume that instruments 40 and 41 are common bimetallic thermostat elements and that 42 is a box exhibiting thermal resistance and capacity. This will result in instrument 41 changing its indication sluggishly when the temperature changes but agreeing with instrument 40 when the temperature has been constant long enough for the temperature to equal inside and outside of delay device 42. If the instruments 40 and 41 be considered as sensitive to the pressure surrounding them, the 42 would be a solid box with a small hole (or holes) connecting the interior and exterior and so offering resistance to the flow of air or other material and the interior would have a storage capacity for the material under pressure.

The mechanism in Figure 4 is an exact equivalent of that in Figure 1. If the two instruments 40 and 41 and the delay device 42 be removed from Figure 4, the remaining gear train is readily seen to be an equivalent for the upper part of Figure 1. This may be demonstrated by connecting bar 4 to point 56 on gear 52 (shown extended by the dotted line) through a conventional connecting rod and by similarly connecting bar 5 to point 56 on gear 51. Then the relative movements of gears 52 and 54 are similar to those of bar 4 and point 14, this will be exactly so if the two mechanisms are constructed so that M and N are the same in both mechanisms. Alternatively, bars 4 and 5 might be equipped with racks and gears 51 and 52 fitted with pinions, thus converting the rectilinear motions of the bars to rotations of the gears. If the gears in Figure 4 be removed and the remainder substituted for the lower part of Figure 1, similar well-known movements would be employed to convert the rotations in Figure 4 to rectilinear motions of the bars 4 and 5. In fact such substitutions are covered by the definition of the term instrument adopted for this specification.

While the figures show complete mechanisms, the particular combinations of elements are quite arbitrary. The discussions of the individual figures have shown some of the equivalences existing. Relying on the principle that things equal to the same thing are equal to each other, it was not felt necessary or even instructive to show the equivalence of every part of each figure to the corresponding parts of all the other figures. Nor was any attempt made to exhaust the permutations and combinations possible with the elements shown as it is felt that the discussions have been ample in scope to permit anyone skilled in the art to construct a mechanism employing such of the alternatives as may be desired.

I claim:

In combination, a first and a second instrument sensitive to a humidity which is to be controlled and having movable portions, the extent of movement of each movable portion being dependent upon the output force exerted by the instrument, as a result of its reaction to a change of said humidity, the first of said instruments being freely exposed to said humidity, the response of said second instrument being rendered substantially inversely proportional to the time rate of change of the said humidity by being surrounded by an inclosure having a combination of storage capacity for water and a resistance to the flow of water vapor, a linkage connecting said movable portions to combine the output forces of said instruments, said linkage being composed of two levers, a primary lever pivoted to said movable portions and a secondary lever pivoted on a fixed portion of the apparatus, said levers being linked together and proportioned in such a manner that when the said primary lever is acted on by the said movable portions, a point on the secondary lever moves according to the following relation, $$Y = M(NX_1 + X_2),$$

in which $Y$ represents the motion of the said point on the said secondary lever, $M$ and $N$ are constants determining the relative efficacy of the said output forces in imparting motion to the said point on the said secondary lever, and $X_1$ and $X_2$ represent the extent of motion of the parts of the said primary lever which are acted on by the said movable portions, means to effect change in the humidity to which said instruments are sensitive and co-operating means actuated by the movable portion of said first instrument and said secondary lever to control the operation of said last-named means, the extent to which said co-operating means is actuated by said secondary lever being dependent upon the extent of movement of said secondary lever point.

DONALD W. McILHINEY.